United States Patent
Brown et al.

(10) Patent No.: US 9,838,475 B2
(45) Date of Patent: Dec. 5, 2017

(54) CONNECTIVITY ANALYSIS AND A MASS STORAGE SYSTEM CAPABLE OF CONNECTIVITY ANALYSIS

(71) Applicant: Infinidat LTD., Herzliya (IL)

(72) Inventors: Eran Brown, Givatayim (IL); Jacob Broido, Tel-Aviv (IL); Anat Rapaport, Hod Hasharon (IL)

(73) Assignee: INFINIDAT LTD., Herzliya (IL)

( * ) Notice: Subject to any disclaimer, the term of this patent is extended or adjusted under 35 U.S.C. 154(b) by 362 days.

(21) Appl. No.: 14/246,224

(22) Filed: Apr. 7, 2014

(65) Prior Publication Data

US 2015/0288585 A1  Oct. 8, 2015

(51) Int. Cl.
  *H04L 29/08* (2006.01)
  *H04L 29/14* (2006.01)
  *H04L 12/26* (2006.01)
  *H04L 12/24* (2006.01)

(52) U.S. Cl.
  CPC ........ *H04L 67/1097* (2013.01); *H04L 41/065* (2013.01); *H04L 41/0677* (2013.01); *H04L 43/0817* (2013.01); *H04L 67/1034* (2013.01); *H04L 69/40* (2013.01)

(58) Field of Classification Search
  CPC ............. H04L 67/1097; H04L 67/1034; H04L 41/065; H04L 41/0677; H04L 41/0695; H04L 43/062; H04L 43/0811; H04L 43/0817; H04L 69/40
  See application file for complete search history.

(56) References Cited

U.S. PATENT DOCUMENTS

| | | | |
|---|---|---|---|
| 6,182,249 B1 * | 1/2001 | Wookey | G06F 11/3461 714/37 |
| 6,381,642 B1 * | 4/2002 | O'Donnell | H04L 12/2602 709/224 |
| 7,685,269 B1 * | 3/2010 | Thrasher | G06F 9/4843 709/224 |
| 2012/0252458 A1 * | 10/2012 | Ohnishi | H04L 43/062 455/436 |

FOREIGN PATENT DOCUMENTS

CN        103618644 A   *   3/2014

* cited by examiner

*Primary Examiner* — Michael C Lai (74) *Attorney, Agent, or Firm* — Reches Patents (57) ABSTRACT

A mass storage system obtains an hierarchical cluster mapping information; Host port state information, which is indicative of a state of at least one host port, is received from an intermediate device of a network that couples hosts to the mass storage system; The mass storage system estimates a state of an entity, which may be one or more host computers or a cluster of host computers. The estimating is based on the hierarchical cluster mapping information and the host port state information. The mass storage system determines whether to generate an alert, in response to the estimated state of the at least one entity. If it is determined to generate an alert then an alert is generated.

17 Claims, 6 Drawing Sheets

CONNECTIVITY ANALYSIS AND A MASS STORAGE SYSTEM CAPABLE OF CONNECTIVITY ANALYSIS

BACKGROUND

Host computers (including host servers) may be connected to a mass storage system in various manners.

Figure 1:
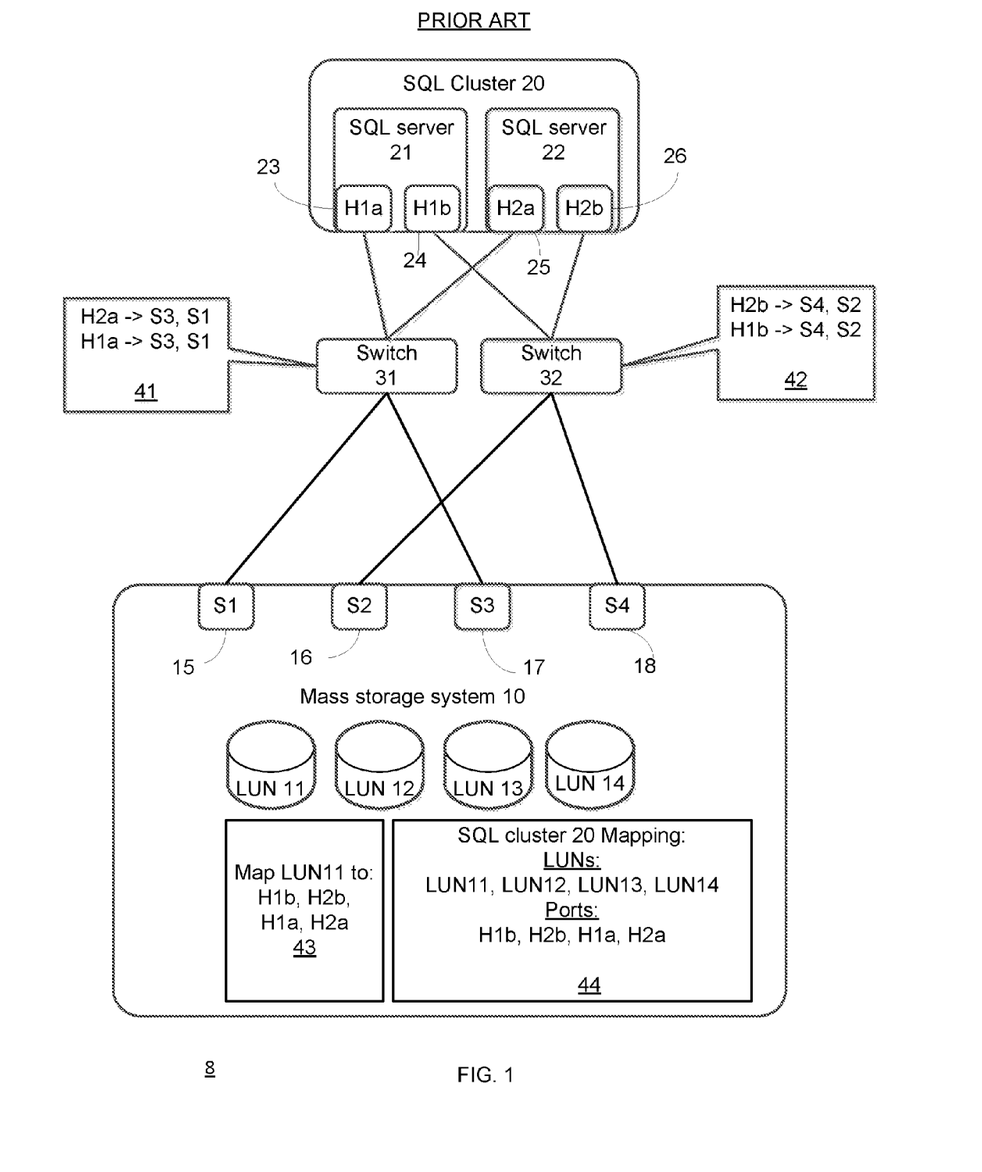
FIG. 1 is a prior art SAN environment.

FIG. 1 illustrates a prior art SAN (Storage Attached Network) environment 8, where hosts servers communicate with a mass storage system 10 via a network for accessing one or more logical volumes provided by the mass storage system. The communication via the SAN is facilitated by switches such as fibre channel switches.

The host servers can be grouped to a cluster of host servers, for example, Structured Query Language (SQL) servers 21 and 22 can be clustered into an SQL cluster 20 that provides an SQL service to applications, other computers or application servers. Another type of cluster is a virtual machine cluster.

For the sake of guarantying data availability and accessibility in case of equipment failures, elements in the network are redundant. Each host server can be connected to the mass storage network via two or more ports, also known to as initiator ports or host ports. Each logical volume in the mass storage system can be exposed to hosts via more than one port of the mass storage system, also known as target ports. Generally two switches facilitate the communication between the host servers and the mass storage system. More than one host server may exist in the cluster that provides a certain service (e.g., hosting, SQL) to applications.

In FIG. 1, SQL server 21 is illustrated as being connected to the SAN via HBA (host bus adapter) ports H1*a* 23 and H1*b* 24, which in turn are respectively connected to network switches 31 and 32. SQL server 22 is connected to the SAN via HBA ports H2*a* 25 and H2*b* 26, which in turn are respectively connected to network switches 31 and 32. SQL cluster 20 provides SQL services to applications or other computers (not shown), by load balancing the workload between the two SQL servers 21 and 22. In case one of the SQL servers fails, the other SQL server can still provide the service, though without computing redundancy. If one of the ports connecting the SQL server to the network fails, the other port can still provide full connectivity of the SQL server.

The configuration of the switches defines that incoming data from a certain host port can be forwarded to a certain storage port(s). The definition of which host port can access which target port is known as a "zone". The zone configuration of switch 31 is represented by zone information 41 that defines that port H2*a* 25 is allowed to forward data to ports S1 15 and S3 17 and port H1*a* 23 is also allowed to forward data to ports S1 15 and S3 17. Likewise, switch 32 is configured according to zone information 42 that defines that port H2*b* 26 is allowed to forward data to ports S2 16 and S4 18 and port H1*b* 24 is also allowed to forward data to ports S2 16 and S4 18.

Mass storage system 10 includes multiple physical storage devices that are mapped to logical volumes. The logical volumes may be exposed to cluster 20 as LUNs (Logical Unit Number) such as LUN 11 that may be accessible through any target port S1 15, S2 16, S3 17 and S4 18.

Mass storage system 10 stores LUN mapping for mapping each LUN allocated to a cluster to host ports of that cluster. For example LUN 11 is mapped to all of the host ports of cluster 20, i.e., host ports H1*a* 23, H1*b* 24, H2*a* 25 and H2*b* 26. Each accessible LUN in the mass storage system should have such LUN mapping that allows a plurality of host ports to initiate input/output (I/O) requests towards the logical volume identified by the LUN.

The mass storage system 10 may be aware of which host ports are connected and communicative with the mass storage system, by receiving a port login message upon each new host port is added to the cluster. The login message includes the identifier of the host port which is typically a WWPN (World Wide Port Name) that is a unique identifier in the network.

Once the connected host ports are recognized by the mass storage system, the LUN mapping, in the mass storage system, can be established between the connected host ports and requested LUNs.

Suppose SQL cluster 20 is requested to gain access to LUNs 11-14, each host port H1*a* 23, H1*b* 24, H2*a* 25 and H2*b* 26 is required to be mapped to each of the four LUNs. In order to avoid individual mapping definition for each port of SQL cluster 20, some mass storage systems enable a configuration for the entire cluster, such as all host ports are associated with the entity 'SQL cluster' and all the required LUNs are also associated with the 'SQL cluster', as illustrated in cluster mapping 44, so that upon adding a new host port, the host port is added to the list of host ports associated with the cluster and there is no need to explicitly associate the new host port with each of the accessible LUNs.

The mass storage system is further aware of host ports that get disconnected by receiving from the network switches 21 and 22 notifications of the disconnected host ports.

Although the mass storage system 10 is aware of host ports disconnection it is unaware of the whether one or more disconnected ports causes a minor problem (for example—one host computer lost one of its host ports), a major problem (for example—a host computer lost all its host ports) or a critical problem (for example—an entire cluster got disconnected).

Some vendors provide external platforms for SAN analysis that monitor the multi-vendor equipment (including servers, network switches and storage equipment) in the SAN for evaluating availability of end-to-end service. Such a platform is connected to all the equipment of all vendors in the SAN and gathers information from the different devices. Examples of such monitoring platform includes: NetApp® OnCommand™ Insight, EMC Smarts and HP SAN Visibility.

There is a growing need to provide the mass storage system means for evaluating the state of the cluster without contacting the equipment of all vendors.

SUMMARY

According to an embodiment of the invention various methods may be provided and are described in the specification. According to various embodiments of the invention there may be provided a non-transitory computer readable medium that may store instructions for performing any of the methods described in the specification and steps thereof, including any combinations of same. Additional embodiments of the invention include a mass storage arranged to execute any or all of the methods described in the specification above, including any stages—and any combinations of same.

According to an embodiment of the invention there may be provided a non-transitory computer readable medium that stores instructions that once executed by a computer cause the computer to perform the stages of obtaining, by a mass storage system, hierarchical cluster mapping information that may be indicative of host computers that belong to a cluster of host computers and of host ports of the host computers of the cluster; receiving, from at least one intermediate device of a network that couples the cluster to the mass storage system, host port state information indicative of a state of at least one host port that belongs to one or more host computers of the cluster; estimating, by the mass storage system, an estimated state of at least one entity out of (a) the one or more host computers, (b) the cluster and (c) at least one path out of a group of paths that couple the mass storage system to the cluster; wherein the estimating may be responsive to the hierarchical cluster mapping information and at least one out of (a) the host port state information, and (b) traffic statistics related to traffic conveyed over the at least one path; determining whether to generate an alert, by the mass storage system, in response to the estimated state of the at least one entity; and if it is determined to generate an alert then generating an alert.

According to an embodiment of the invention there may be provided a mass storage system that may include a storage module and a processor; wherein the storage module may be arranged to store hierarchical cluster mapping information that may be indicative of host computers that belong to a cluster of host computers and of host ports of the host computers of the cluster; wherein the processor may be arranged to (i) receive, from at least one intermediate device of a network that couples the cluster to the mass storage system, host port state information indicative of a state of at least one host port that belongs to one or more host computers of the cluster; (ii) estimate an estimated state of at least one entity out of (a) the one or more host computers, (b) the cluster and (c) at least one path out of a group of paths that couples the mass storage system to the cluster; wherein the estimating may be responsive to the hierarchical cluster mapping information and at least one out of (i) the host port state information, and (ii) traffic statistics related to traffic conveyed over the at least one path; determining whether to generate an alert, by the mass storage system, in response to the estimated state of the at least one entity; and if it is determined to generate an alert then generating an alert.

According to an embodiment of the invention there may be provided a method that may include obtaining, by a mass storage system, hierarchical cluster mapping information that may be indicative of host computers that belong to a cluster of host computers and of host ports of the host computers of the cluster; receiving, from at least one intermediate device of a network that couples the cluster to the mass storage system, host port state information indicative of a state of at least one host port that belongs to one or more host computers of the cluster; estimating, by the mass storage system, an estimated state of at least one entity out of (a) the one or more host computers, (b) the cluster and (c) at least one path out of a group of paths that couple the mass storage system to the cluster; wherein the estimating may be responsive to the hierarchical cluster mapping information and at least one out of (a) the host port state information, and (b) traffic statistics related to traffic conveyed over the at least one path; determining whether to generate an alert, by the mass storage system, in response to the estimated state of the at least one entity; and if it is determined to generate an alert then generating an alert.

The alert may include at least one out of an identity of the at least one entity and the estimated state of the at least one entity.

The determining of whether to generate an alert, by the mass storage system, may be responsive to at least the estimated state of the at least one entity.

The storage system may be coupled to multiple clusters, wherein the host port state information refers to a host computer that belongs to a certain cluster of the multiple clusters and the method may include determining an identity of the certain cluster.

The host port state information may be indicative of whether a certain host port is connected or disconnected.

The intermediate entities are fibre channel switches and wherein the certain host port state information are embedded in messages sent to the mass storage system from the fibre channel switches.

The method may include generating an alert if the traffic statistics are indicative of a deviation in a traffic pattern from an allowable traffic pattern.

The method may include generating the alert if the traffic statistics are indicative of a non-allowable unbalanced traffic.

The estimating of the estimated state of the at least one path may be further responsive to traffic rules applied by the network.

The estimating of the estimated state may include estimating a severity of the estimated state.

The estimated state may be indicative of whether all host ports of a certain host computer have potentially failed.

The determined state may be indicative of whether all host ports of the cluster have potentially failed.

The determined state may be indicative of whether only a part of all host ports of the cluster have potentially failed.

The estimated state may be indicative of whether a host computer has potentially failed.

The estimated state may be indicative of whether the cluster has potentially failed.

The method may include allocating logical volumes to host computers of the cluster.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

There are provided, systems, methods and non-transitory computer readable media for There is provided a mass storage system enables a hierarchy mapping configuration for associating a cluster, host computers of the cluster and host ports of the host computer to target ports of the mass storage system.

Figure 2:
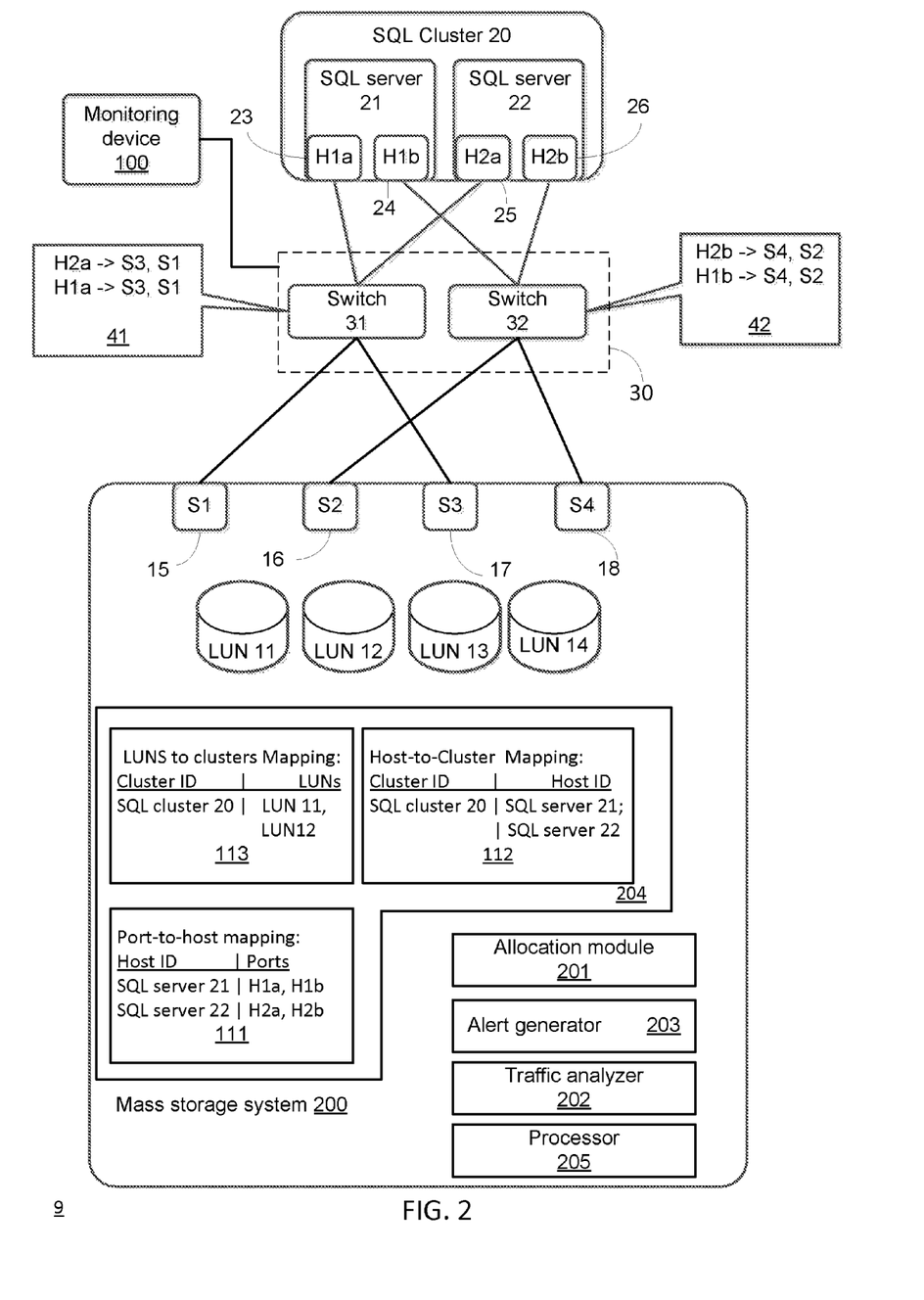
FIG. 2 illustrates a SAN environment according to an embodiment of the invention.

FIG. 2 illustrates a SAN environment 9 according to an embodiment of the invention.

SAN environment 9 includes a monitoring device 100, SQL cluster 20, network 30 (that includes switches 31 and 32) and mass storage system 200.

It is noted that FIG. 2 is merely an example of an environment that includes a mass storage system 200. For example, the mass storage system 200 may be coupled via a network that includes more than two switches, the network may include intermediate devices (such as servers) that differ from switches, the intermediate switches may be arranged in a multiple hierarchical layers, and the like. Yet for another example, the mass storage system 200 may be coupled via a network to multiple clusters, to one or more clusters that differ from an SQL cluster and may include host computers that differ from SQL servers. Furthermore, the number of host ports per host computer and the number of hosts per cluster may differ from two. The number of mass storage ports may differ from four.

The monitoring device 100 may be a computer, a tablet or a smart phone accessed by an administrator. The mass storage system 200 may generate alerts and send them (over network 30 and/or over another network (not shown)) to the monitoring device 100. The alerts may pass through the paths coupling between host ports and mass storage system ports or via other paths dedicated for management commands and monitoring, such as local area network, web paths (e.g., using HTTP/HTTPS) or cellular network.

An example of a mass storage system may be the Infinibox of Infinidat Ltd of Herzliya Israel.

The mass storage system 200 may include a control layer and a permanent storage layer (both not shown). The permanent storage layer may include multiple disk drives that support storage of multiple logical volumes. The logical volumes may be mapped to disk drives by the control layer. The logical volumes may be associated with LUNs wherein a single logical volume may be accessed using different LUN values.

The control layer of the mass storage system may include a processor 205, an allocation module 201, a traffic analyser 202 and an alert generator 203.

The allocation module 201, the traffic analyser 202 and the alert generator 203 may be a part of processor 205, may be implemented by one or more processors, one or more computers or one or more servers that execute instructions, code, software and/or firmware embedded in non-transitory computer readable medium. A processor may be a general purpose processor, a digital signal processor, a dedicated hardware processor and the like.

The allocation module 201 is arranged to allocate LUNs to hosts and host clusters entities such as SQL cluster 20, SQL servers 21 and 22 and the like. It may generate the LUN mapping information 113.

The traffic analyser 202 is arranged to generate traffic statistics related to traffics from host ports 23-26.

The storage module 204 is arranged to store LUN mapping information 113 and for storing hierarchical cluster mapping information that is indicative of a hierarchy mapping configuration.

The processor 205 is arranged to estimate a state of one or more entity out of SQL cluster 20, SQL server 21, SQL server 22 and any path that coupled the mass storage system to either one out of SQL cluster 20, SQL server 21, SQL server 22.

The hierarchical mapping information may include Ports-to-Host mapping information 111 and Hosts-to-Cluster mapping information 112. The Hosts-to-Cluster mapping information 112 is indicative of host computers that belong to a cluster of host computers. These host computers are arranged to access the mass storage system 200. The Ports-to-Host mapping information 111 is indicative of host computer ports of the host computers of the cluster.

Ports-to-Host mapping may be defined for each host connected to the system. For example, as illustrated in Ports-to-Host mapping information 111, the SQL server 21 is associated with ports H1a 23 and H1b 24 and SQL server 22 is associated with ports H2a 25 and H2b 26.

Hosts-to-Cluster mapping may be defined for each cluster connected to the mass storage system 200. The SQL cluster 20 enables configuring which host computers are included in the cluster. For example, as illustrated in Hosts-to-Cluster mapping information 112, the SQL cluster 20 enables associating SQL servers 21 and 22 with SQL cluster 20.

The mass storage system 200 may also generate LUN mapping information 113 that enables associating clusters to LUNs. For example, as illustrated in LUN mapping information 113, SQL cluster 20 is associated with LUN11 and LUN12. The hierarchy mapping configuration enables the mass storage system 200 to estimate the implication of a host port failure (or a state of a path between the host port and a port of the mass storage system) on the connectivity of an entity out of the cluster and a host computer of the cluster and to provide an alert that includes the severity and the essence of the failure, based on the number of failed ports out of the total number of ports of the entity and their assignment.

The mass storage system 200 can generate an alert (message, audio indication, visual indication) that may can include, in addition to just reporting an identifier of the failed host port, information that includes at least one out of the affected host computer, the affected cluster, the state of the affected host computer ("up with a single point of failure" or "down"), the state of the cluster ("up" and the amount of operational servers, "down"), and a severity of the failure.

Generally, switches 31 and 32 report disconnected host ports (due to host port, host computer or cluster failures) and may also report host ports that got disconnected due to a zone deletion, due to a re-configuration of the switches. Zone deletions may be done deliberately, but may also be a result of an administrator error.

In order to recognize a host port disconnection that occurred due to non-reported disconnection (disconnection not reported by the switch to the mass storage system), the mass storage system may further perform statistics on traffic between the cluster and the mass storage system—especially generate traffic statistics related to initiating host ports and the destination ports associated with traffic (such as incoming I/O requests), and may monitor the distribution of I/O requests initiated by the different host ports in the cluster.

Generally, clusters and hosts usually apply load balancing scheme to even out the traffic among substantially identical host computers, among ports of a host computer and among paths connecting the host and/or cluster with the storage system. In this case, the distribution of I/O requests (traffic distribution) initiated by the host ports, as well as the distribution of I/O requests received by the storage ports, may be expected to even (e.g., if there are four host ports per cluster, each should initiate about a quarter of the total I/O requests of the cluster. Similarly, for four storage ports, each storage port should receive about a quarter of the incoming I/O requests).

The mass storage system may detect an uneven distribution or any variant from expected distribution. By gathering the statistics, the mass storage system is able to detect idle host ports that were not reported by the switch as disconnected ports.

The system can use the hierarchy mapping configuration to estimate a condition of unbalanced communication, for example, some ports of the cluster are very busy while other are idle.

It is noted that although some of the mentioned above text referred to host ports as idle (disconnected) or not, the traffic statistics may classify host ports to more than two classes of activity—for example the traffic from a host may be classified to K different activity classes, wherein K may exceed two. For example K may be 100.

The traffic statistics may be processed to estimate IO activity profiles of host ports, host computer, storage ports and the cluster and to detect unacceptable deviations from these IO activity profiles. The amount of deviations that may be regarded as unacceptable may be defined by an administrator, may be a fixed amount of deviation (for example—a certain percentage—20%, 30% and the like) or may be changed dynamically over time.

The following four examples illustrate potential host port malfunction scenarios and the alerts that are provided by the mass storage system in response to a detection of these potential host port malfunctions. The mass storage system may estimate that a host port malfunctioned based upon (a) notification from a switch about a disconnected port and/or (b) traffic statistics that are indicative of an irregular connectivity of a host port.

The failure of a host or cluster is deemed potential as a failure may also occur in the network that couples the cluster to the mass storage system.

The traffic statistics may indicate the distribution of traffic over one or more time windows.

Table 1 illustrates the identifier used in the following examples:

TABLE 1

| Entity | identifier |
| --- | --- |
| Cluster 20 | SQL-cluster1 |
| SQL server 21 | SQL1 |
| SQL server 22 | SQL2 |
| Host port H1a 23 | AA:BB:CC:DD:EE:FF:00:11 |
| Host port H1b 24 | 01:12:23:34:45:5A:AB:BC |
| Host port H2a 25 | FF:FF:FF:DD:CC:FF:CC:AA |
| Host port H2b 26 | 99:88:77:66:55:44:33:22 |

First example—single host port disconnected. The mass storage system receives from the switch a notification about a disconnected host port, which can occur when the host port is defected or the cable coupled to the host port is disconnected or a respective zone was removed. Suppose host port H1a 23 is reported as disconnected while all other host ports of SQL cluster 20 are active.

Analysing the ports-to-host mapping information 111 and the hosts-to-cluster mapping information 112 reveals that SQL server 21 still has one more operating host port and the other SQL server 22 has two operating host ports. The alert message may include the following information:

SQL1 of SQLcluster1 has lost 1 path (1 path remaining)
Disconnected host port: AA:BB:CC:DD:EE:FF:00:11
SQL1 state: up, potentially single point of failure
Cluster state: up, 2 of 2 servers operational
Problem severity: minor Second example—SQL server 21 is disconnected (or both host ports of SQL server 21 are disconnected). The mass storage system 200 detects that both failed ports belongs to SQL server 21 and can generate an alert message that includes the following information:

SQL1 of SQL-cluster1 has lost 2 paths (0 path remaining)
Disconnected host ports: AA:BB:CC:DD:EE:FF:00:1
01:12:23:34:45:5A:AB:BC
SQL1 state: potentially down, 0 of 2 paths active
Cluster state: up, 1 of 2 servers operational, 1 of 2 servers potentially failed
Problem severity: major Third example—both SQL servers 21 and 22 are disconnected (or both host ports of both SQL servers are disconnected). The mass storage system 200 detects that there is no operational host ports in the cluster 200 and can generate an alert message that includes the following information: SQL1 and SQL2 of SQL-cluster1 have lost 4 paths (0 path remaining)

Disconnected Host ports: AA:BB:CC:DD:EE:FF:00:11
    01:12:23:34:45:5A:AB:BC
    FF:FF:FF:DD:CC:FF:CC:AA
    99:88:77:66:55:44:33:22
    SQL1 state: potentially down, 0 of 2 paths active
    SQL2 state: potentially down, 0 of 2 paths active
    Cluster state: potentially down, 0 of 2 servers operational
    Problem severity: Critical Forth example—unbalanced communication. In case that this situation occurs due to a host problem, the mass storage system 200 does not receive a port-disconnected notification from the switch. An example of a host problem that may cause unbalanced communication is a fault in a multi-pathing module in the host, which is responsible for managing multiple redundant paths between the host and the storage system by utilizing redundant physical path components: adapters, cables, and switches. According to the gathered statistics on incoming traffic, mass storage system 200 can determine that there is a traffic imbalance. Suppose the gathered statistics indicate that: (i) all storage ports S1-S4 15-18 receive traffic from SQL server 22 (which means that both switches 31 and 32 are functioning, as well as all four storage ports S1-S4 15-18), (ii) only storage port S2 16 receives traffic from SQL server 21, originated only from host port H1b 24. Since host port H1b 24 is operational, it should have transmitted also towards storage port S4 18. Since it is known that storage port S4 18 and the switch 32, connected to this port, are both functioning (receiving traffic in this path from the other SQL server 22), and it is also known that the path from SQL server 21 through switch 32 is also functioning (as storage port S2 16 is receiving traffic from SQL server 21 through switch 32), mass storage system 200 can determine that there is a multipath problem in SQL server 21 and can generate an alert message that includes the following information: SQL1 is unbalanced as all the traffics coming from SQL1 are received via target port S2 16.

Traffic Distribution:
    First path from H1a to S1: 0%
    Second path from H1b to S2: 100%
    Third path from H1a to S3: 0%
    Fourth path from H1b to S4: 0%

It is noted that cluster traffic imbalance alerts may be generated by the mass storage system 200 and that SQL server imbalance alerts may be generated by the mass storage system 200. For example—if an SQL server is unbalanced but the distribution between the SQL servers of the clusters are balanced (total traffic from each SQL server of the cluster is the same), then a SQL server imbalance alert may be generated.

It is noted that traffic imbalances may be an example of deviations from desired traffic patterns. Alerts may be generated when such deviations are detected by the mass storage system. Furthermore—in some case certain traffic unbalances may be allowed (for example—in case of having host computers or clusters of higher priorities than others or having higher performance capabilities than others).

Figure 3:
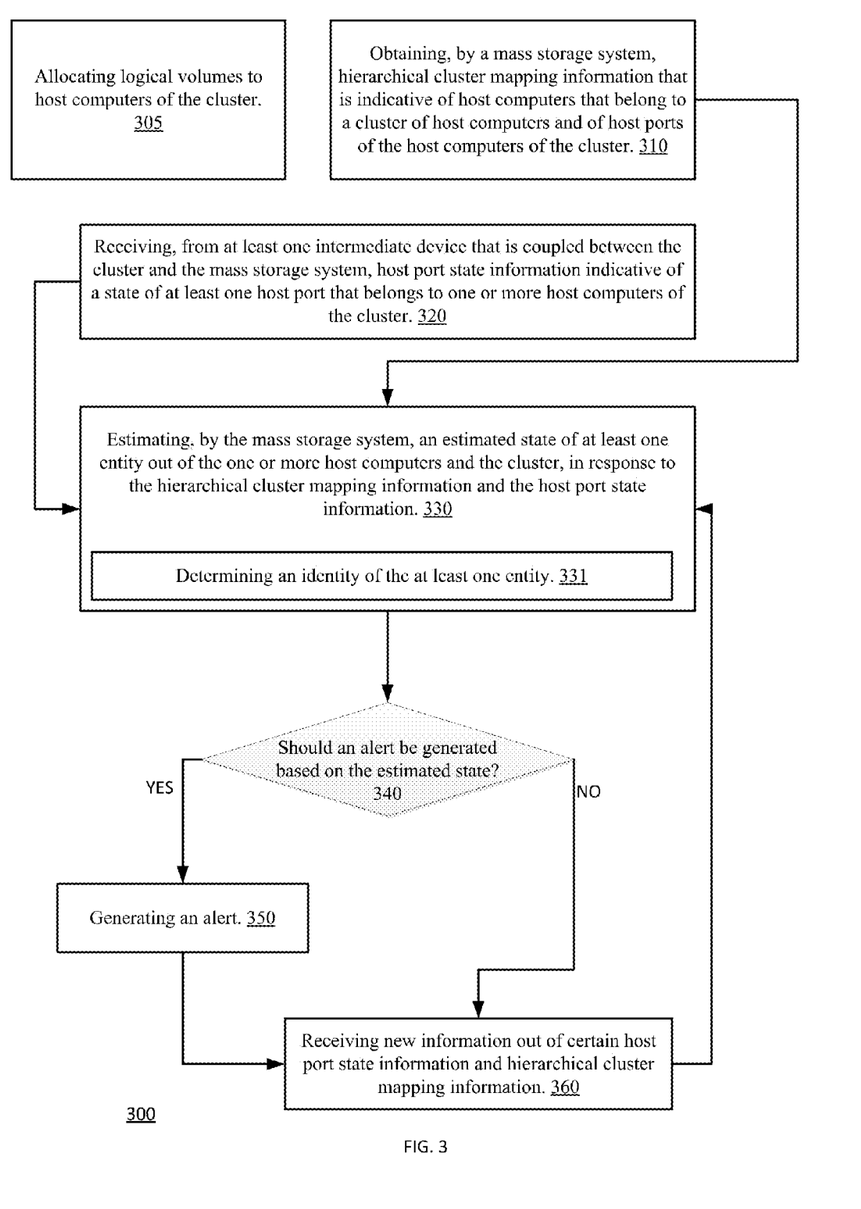
FIG. 3 illustrates a method according to an embodiment of the invention.

FIG. 3 illustrates method 300 for connectivity analysis according to an embodiment of the invention.

Method 300 may start by stages 310 and 320.

Stage 310 may include obtaining, by a mass storage system, hierarchical cluster mapping information that is indicative of host computers that belong to a cluster of host computers and of host ports of these host computers.

Stage 320 may include receiving, from at least one intermediate device that is coupled between the cluster and the mass storage system, host port state information indicative of a state of at least one host port that belongs to one or more host computers of the cluster.

Stages 310 and 320 may be followed by stage 330.

Stage 330 may include estimating, by the mass storage system, an estimated state of at least one entity out of the one or more host computers and the cluster, in response to the hierarchical cluster mapping information and the host port state information. The estimating may be also responsive to previous received information such as previously received host port state information and previous conclusions related to the state of the cluster and/or host computer.

The storage system may be coupled to multiple clusters. The host port state information received during stage 320 may refer to a host computer that belongs to a certain cluster of the multiple clusters. Stage 330 may include stage 331 of determining an identity of the certain cluster. Stage 331 may also include determining an identity of the certain host that belongs to the certain cluster and includes the relevant host port.

Stage 330 may be responsive to traffic rules applied by the network. Traffic rules may be rules for controlling traffic over the network, including traffic shaping, switching rules, routing rules and the like. A non-limiting example of traffic rules is zone information 41 and 42 of FIG. 2. If, for example, zone information 41 blocks a path between H1a and S1 than a lack of traffic over that path should not be indicative of an H1a failure.

Stage 330 may be followed by stage 340. Stage 340 may include determining, by the mass storage system, in response to the estimated state, whether to generate an alert.

If it is determined to generate an alert ("YES") then stage 340 is followed by stage 350 of generating an alert. Stage 350 may include sending the alert to a monitoring device.

If it is determined not to generate an alert ("NO") then stage 340 may be followed by stage 360 of receiving new information out of certain host port state information and hierarchical cluster mapping information. Stage 360 may be followed by stage 330.

The certain host port state information may be indicative of whether the certain host port is connected or disconnected.

The intermediate entities may be fibre channel switches and the certain host port state information may be embedded in messages sent to the mass storage system from the fibre channel switches.

Stage 330 may include estimating a severity of the estimated state. For example, a potentially failed cluster is more severe than a potentially failed host computer or a potentially failed host port.

The determined state may be indicative of whether all or only some of host ports of a host computer have potentially failed, of whether all of the host ports of the cluster have potentially failed, of whether a host computer has potentially failed, or whether the cluster has potentially failed—the determined state may indicate whether the host is operating with single point of failure (i.e., only one operational port or path is left), weather the host is still operating in redundant mode (two or more ports or paths are left), whether the cluster is operating with single point of failure (i.e., only one operational host), weather the cluster is still operating in redundant mode (two or more operational hosts are left).

The method may include allocating (stage 305) logical volumes to host computers of the cluster. The allocating may include assigning LUN identifiers to pairs that include (a) a logical volume and (b) entity (a host computer or cluster) mapped to the logical volume.

Figure 4:
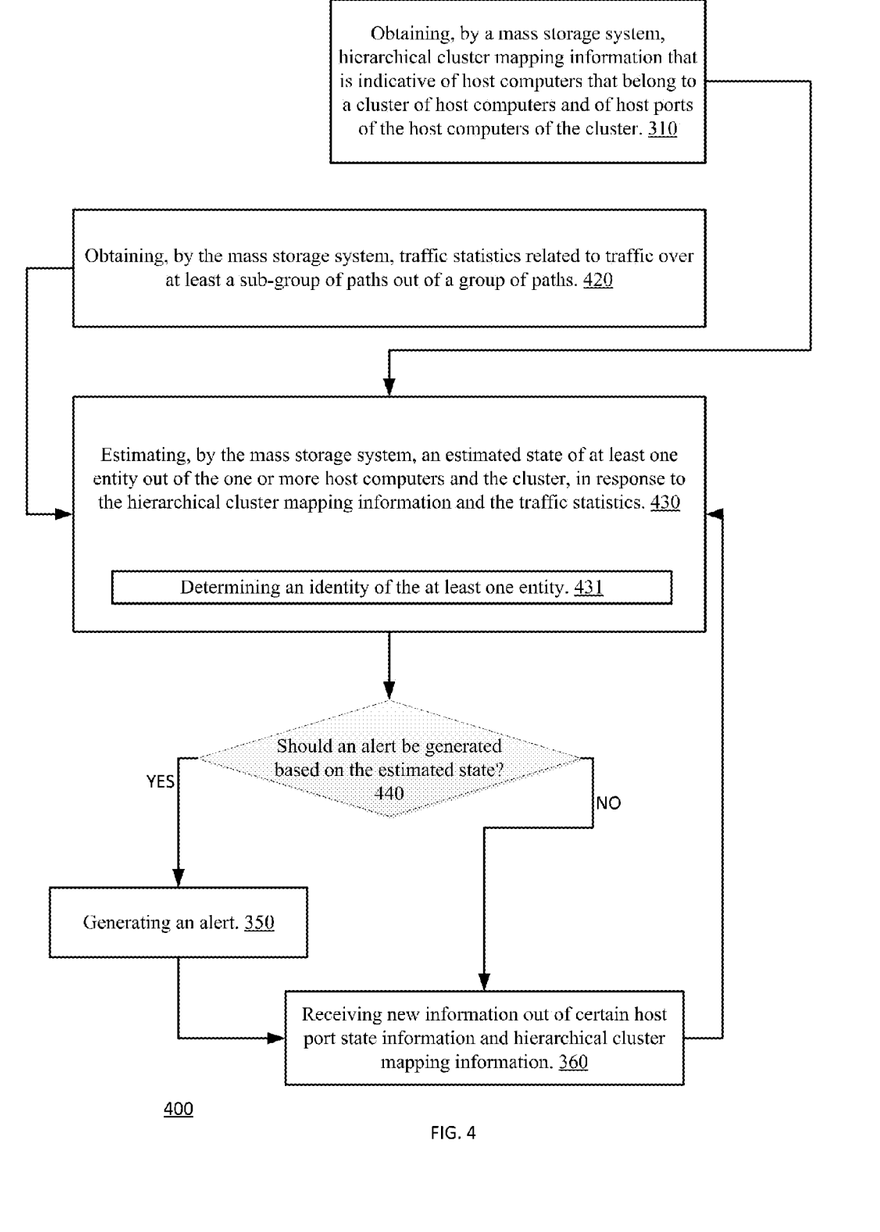
FIG. 4 illustrates a method according to an embodiment of the invention.

FIG. 4 illustrates method 400 according to an embodiment of the invention.

Method 400 may start by stages 310 and 420.

Stage 310 may include obtaining, by a mass storage system, hierarchical cluster mapping information that is indicative of host computers that belong to a cluster of host computers and of host ports of the host computers of the cluster.

Stage 420 may include obtaining, by the mass storage system, traffic statistics related to traffic over at least a sub-group of paths out of a group of paths.

The group of paths may couple the host computer ports to mass storage system ports. Referring to the example set forth in FIG. 2—there are eight paths H1a to S1, H1a to S3, H1b to S2, H1b to S4, H2a to S1, H2a to S3, H2b to S2 and H2b to S4. In this example the sub-group of paths may include one till eight of these eight paths.

Stages 310 and 420 may be followed by stage 430 of estimating, by the mass storage system, an estimated state of at least one entity out of the one or more host computers and the cluster, in response to the hierarchical cluster mapping information and the traffic statistics.

Stage 430 may include evaluating the estimated state of one or more paths and then estimating, based upon the state of one or more paths, the estimated state of the cluster and/or host computer coupled to each of the one or more paths. For example an idle state of the path "H1a to S1" may represent a failure of SQL server 21 or of SQL cluster 20. It may also be indicative of a failure of the path itself (due to e.g., a fault within SQL server 21). The mass storage system 200 may or may not be able to detect the exact source of failure (path or host).

The estimating may be also responsive to previous received information such as previously received host port state information and previous conclusions related to the state of the cluster and/or host computer.

The storage system may be coupled to multiple clusters. The host port state information received during stage 420 may refer to a host computer that belongs to a certain cluster of the multiple clusters. Stage 430 may include stage 431 of determining an identity of the certain cluster. Stage 431 may also include determining an identity of the certain host that belongs to the certain cluster and includes the relevant host port.

Stage 430 may be followed by stage 440 of determining, by the mass storage system, in response to the estimated state, whether to generate an alert.

If it is determined to generate an alert ("YES") then stage 440 is followed by stage 350 of generating an alert. Stage 350 may include sending the alert to a monitoring device.

If it is determined not to generate an alert ("NO") then stage 440 may be followed by stage 360 of receiving new information such as certain host port state information and hierarchical cluster mapping information. Stage 360 may be followed by stage 430.

Stage 350 may include generating an alert if the traffic statistics are indicative of a deviation in a traffic pattern from an allowable traffic pattern. The deviation may be a non-allowable deviation.

Stage 350 may include generating the alert if the traffic statistics are indicative of a non-allowable unbalanced traffic.

Stage 430 may be responsive to traffic rules applied by the network. Traffic rules may be rules for controlling traffic over the network, including traffic shaping, switching rules, routing rules and the like. A non-limiting example of traffic rules is zone information 41 and 42 of FIG. 2. If the traffic rules, for example, block a certain path (or reduce its traffic in comparison to other paths) then it should be expected that lack of traffic over that path is not indicative of a failure of a host port coupled to that path.

Figure 5:
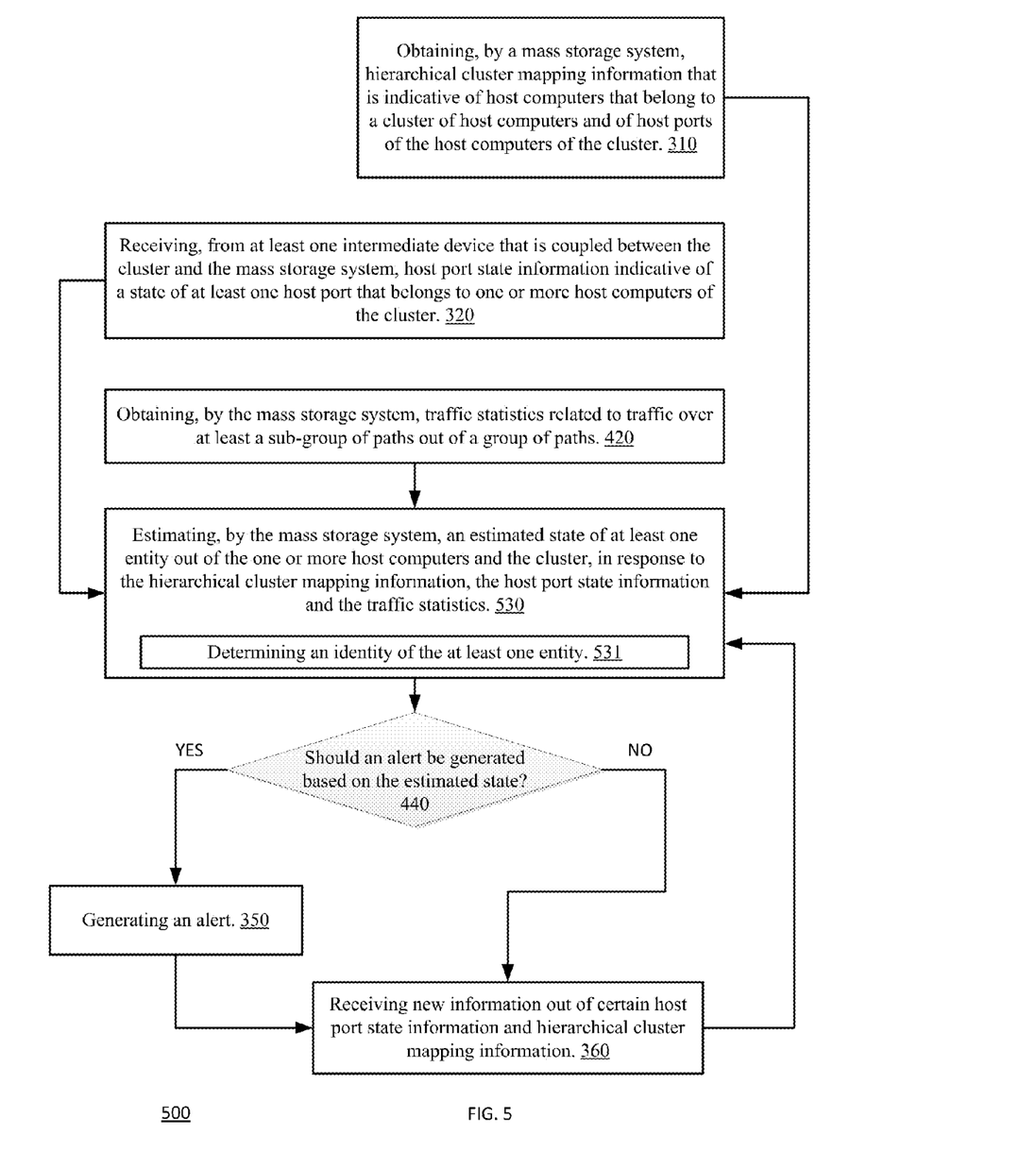
FIG. 5 illustrates a method according to an embodiment of the invention.

FIG. 5 illustrates method 500 according to an embodiment of the invention.

Method 500 may start by stages 310, 320 and 420.

Stage 310 may include obtaining, by a mass storage system, hierarchical cluster mapping information that is indicative of host computers that belong to a cluster of host computers and of host ports of the host computers of the cluster.

Stage 320 may include receiving, from at least one intermediate device that is coupled between the cluster and the mass storage system, host port state information indicative of a state of at least one host port that belongs to one or more host computers of the cluster.

Stage 420 may include obtaining, by the mass storage system, traffic statistics related to traffic over at least a sub-group of paths out of a group of paths.

Stages 310, 420 and 520 may be followed by stage 530 of estimating, by the mass storage system, an estimated state of at least one entity out of the one or more host computers and the cluster, in response to the hierarchical cluster mapping information, the host port state information and the traffic statistics.

The estimating may be also responsive to previous received information such as previously received host port state information and previous conclusions related to the state of the cluster and/or host computer.

The storage system may be coupled to multiple clusters. The host port state information received during stage 520 may refer to a host computer that belongs to a certain cluster of the multiple clusters. Stage 530 may include stage 531 of determining an identity of the certain cluster. Stage 531 may also include determining an identity of the certain host that belongs to the certain cluster and includes the relevant host port.

Stage 530 may include evaluating the estimated state of one or more paths and then estimating, based upon the state of one or more paths, the estimated state of the cluster and/or host computer coupled to each of the one or more paths. For example an idle state of the path "H1a to S1" may represent a failure of SQL server 21 or of SQL cluster 20. It may also be indicative of a failure of the path itself—but the mass storage system 200 may not be able to detect the exact source of failure (path or host).

Stage 530 may be followed by stage 440 of determining, by the mass storage system, in response to the estimated state, whether to generate an alert.

If it is determined to generate an alert ("YES") then stage 440 is followed by stage 350 of generating an alert. Stage 350 may include sending the alert to a monitoring device.

If it is determined not to generate an alert ("NO") then stage 440 may be followed by stage 360 of receiving new information out of certain host port state information and hierarchical cluster mapping information. Stage 360 is followed by stage 330.

Stage 350 may include generating an alert if the traffic statistics are indicative of a deviation in a traffic pattern from an allowable traffic pattern. The deviation may be a non-allowable deviation.

Stage 350 may include generating the alert if the traffic statistics are indicative of a non-allowable unbalanced traffic.

Stage 530 may be responsive to traffic rules applied by the network. Traffic rules may be rules for controlling traffic over the network, including traffic shaping, switching rules, routing rules and the like.

Figure 6:
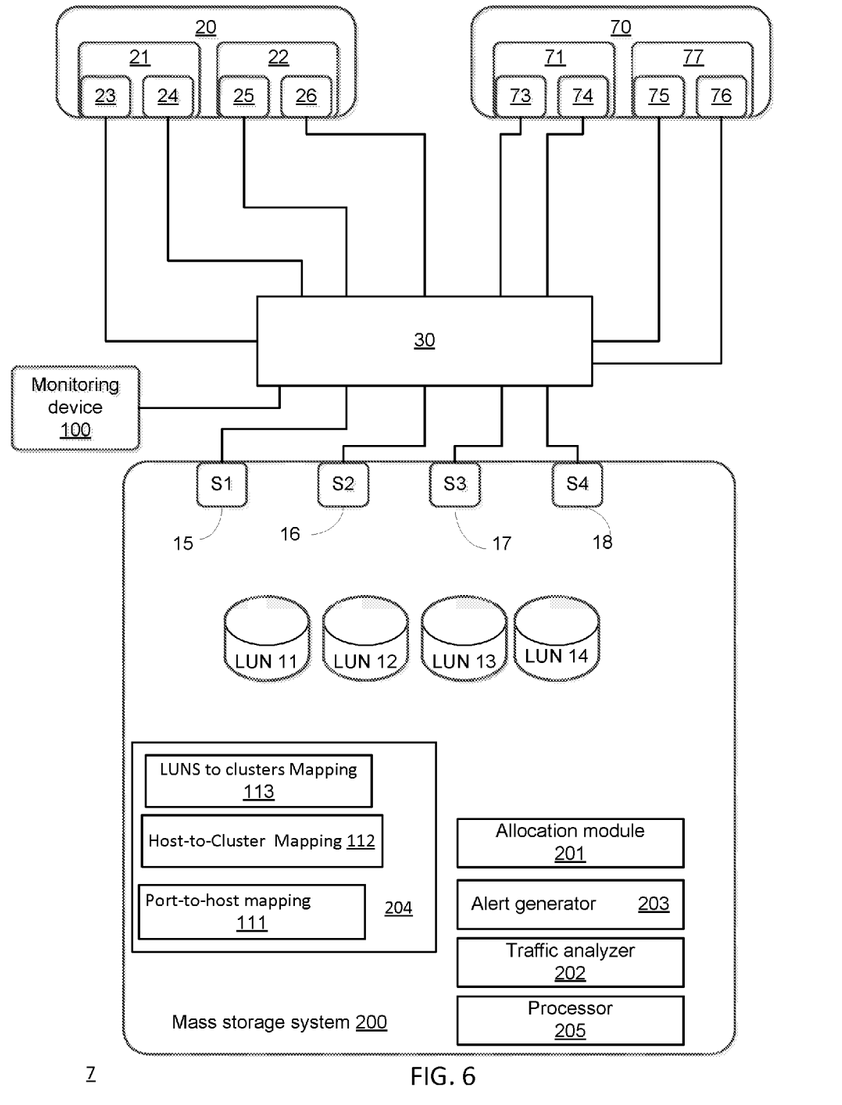
FIG. 6 illustrates a SAN environment according to an embodiment of the invention.

FIG. 6 illustrates a SAN environment 7 according to an embodiment of the invention.

The mass storage system 200 may be coupled via one or more networks (such as network 30) to multiple clusters. FIG. 6 illustrates a SAN environment 7 that includes monitoring device 100, SQL cluster 20, a second cluster 70, network 30 and mass storage system 200. The number of clusters that are coupled to the mass storage system may exceed two. The number of host computer per cluster may differ from cluster to another or may be equal to each other. Although FIG. 6 illustrates two host computer per cluster (21 and 22 per cluster 20 and 71 and 72 per cluster 70) and two ports per host computer (23 and 24 per host computer 21, 23 and 24 per host computer 21, 25 and 26 per host computer 22, 73 and 74 per host computer 71, 75 and 75 per host computer 72), the number of host ports per host computers may differ from two.

It is noted that different clusters may share a storage system port, a switch or other intermediate element of network 30 and the like.

When coupled to multiple clusters the mass storage system 200, based upon hierarchical cluster mapping information and determines the identity of the cluster and host computer that are affected by a potential port or path failure.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, state bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for connectivity analysis by a mass storage system that is coupled to one or more clusters of host computers, the method comprises:
   obtaining, by the mass storage system, hierarchical cluster mapping information that includes: (i) a mapping of host computers to a cluster that maps host computers to the one or more clusters, and (ii) a mapping of host ports to a host computer that maps host ports to host computers;
   receiving, from at least one intermediate device of a network that couples the one or more clusters to the mass storage system, host port state information indicative of a state of at least one host port;
   determining, based on the hierarchical cluster mapping information, an identity of at least one entity out of: at least one host computer that includes the at least one host port; and at least one cluster that includes the at least one host computer;
   estimating, by the mass storage system, a state of at least one entity out of (a) the at least one host computer, and (b) the at least one cluster, so as to provide an estimated state of the at least one entity; wherein the estimating is based on the hierarchical cluster mapping information and the host port state information;
   determining whether to generate an alert, by the mass storage system, in response to the estimated state of the at least one entity;
   if determining to generate an alert then generating a first alert;
   estimating, by the mass storage system, a state of at least one path out of a group of paths that couple the mass storage system to the one or more clusters, based on traffic statistics related to traffic conveyed over the at least one path; and
   generating a second alert if the traffic statistics are indicative of a deviation in a traffic pattern from an allowable traffic pattern.

2. The method according to claim 1 wherein the first alert comprises at least one out of the identity of the at least one entity and the estimated state of the at least one entity.

3. The method according to claim 1 wherein the determining of whether to generate an alert, by the mass storage system, is in response to at least the estimated state of the at least one entity.

4. The method according to claim 1 wherein the mass storage system is coupled to multiple clusters, wherein the host port state information refers to a host computer that belongs to a certain cluster of the multiple clusters and the method comprises determining an identity of the certain cluster.

5. The method according to claim 1 wherein the host port state information is indicative of whether a certain host port is connected or disconnected.

6. The method according to claim 1 wherein the at least one intermediate device is at least one fibre channel switch and wherein the host port state information is embedded in messages sent to the mass storage system from the at least one fibre channel switch.

7. The method according to claim 1 comprising generating the second alert if the traffic statistics are indicative of a non-allowable unbalanced traffic.

8. The method according to claim 1 wherein the estimating of the state of the at least one path is further based on traffic rules applied by the network.

9. The method according to claim 1 wherein the estimating comprises estimating a severity of the estimated state.

10. The method according to claim 1 wherein the estimated state is indicative of whether all host ports of a certain host computer have potentially failed.

11. The method according to claim 1 wherein the estimated state is indicative of whether all host ports of a certain cluster have potentially failed.

12. The method according to claim 1 wherein the estimated state is indicative of whether only a part of all host ports of a certain cluster have potentially failed.

13. The method according to claim 1 wherein the estimated state is indicative of whether a host computer has potentially failed.

14. The method according to claim 1 wherein the estimated state is indicative of whether a certain cluster has potentially failed.

15. The method according to claim 1 comprising allocating logical volumes to host computers of the cluster.

16. A non-transitory computer readable medium that stores instructions that once executed by a mass storage system that is coupled to one or more clusters of host computers cause the mass storage system to perform the steps of:

obtaining, by the mass storage system, hierarchical cluster mapping information that includes: (i) a mapping of host computers to a cluster, that maps host computers to the one or more clusters, and (ii) a mapping of host ports to a host computer that maps host ports to host computers;

receiving, from at least one intermediate device of a network that couples the one or more clusters to the mass storage system, host port state information indicative of a state of at least one host port;

determining, based on the hierarchical cluster mapping information, an identity of at least one entity out of: at least one host computer that includes the at least one host port; and at least one cluster that includes the at least one host computer;

estimating, by the mass storage system, a state of at least one entity out of (a) the at least one host computer, and (b) the at least one cluster, so as to provide an estimated state of the at least one entity; wherein the estimating is based on the hierarchical cluster mapping information and the host port state information;

determining whether to generate an alert, by the mass storage system, in response to the estimated state of the at least one entity;

if determining to generate an alert then generating a first alert;

estimating, by the mass storage system, a state of at least one path out of a group of paths that couple the mass storage system to the one or more clusters, based on traffic statistics related to traffic conveyed over the at least one path; and generating a second alert if the traffic statistics are indicative of a deviation in a traffic pattern from an allowable traffic pattern.

17. A mass storage system that is coupled to one or more clusters of host computers and comprises a storage module and a processor;

wherein the storage module is arranged to store hierarchical cluster mapping information that includes: (i) a mapping of host computers to a cluster that maps host computers to the one or more clusters; and (ii) a mapping of host ports to a host computer that maps host ports to host computers;

wherein the processor is arranged to:

(i) receive, from at least one intermediate device of a network that couples the one or more clusters to the mass storage system, host port state information indicative of a state of at least one host port; and determine, based on the hierarchical cluster mapping information, an identity of at least one entity out of: at least one host computer that includes the at least one host port; and at least one cluster that includes the at least one host computer;

(ii) estimate a state of at least one entity out of (a) the at least one host computer, and (b) the at least one cluster, so as to provide an estimated state of the at least one entity; wherein the estimating is based on the hierarchical cluster mapping information and the host port state information;

(iii) determine whether to generate an alert in response to the estimated state of the at least one entity;

(iv) if generating an alert is determined then generate a first alert;

(v) estimate a state of at least one path out of a group of paths that couple the mass storage system to the one or more clusters, based on traffic statistics related to traffic conveyed over the at least one path; and (vi) generate a second alert if the traffic statistics are indicative of a deviation in a traffic pattern from an allowable traffic pattern.

* * * * *